Aug. 29, 1944.    R. R. CURTIS    2,357,174
FUEL PUMPING SYSTEM
Filed Sept. 5, 1941    2 Sheets—Sheet 1
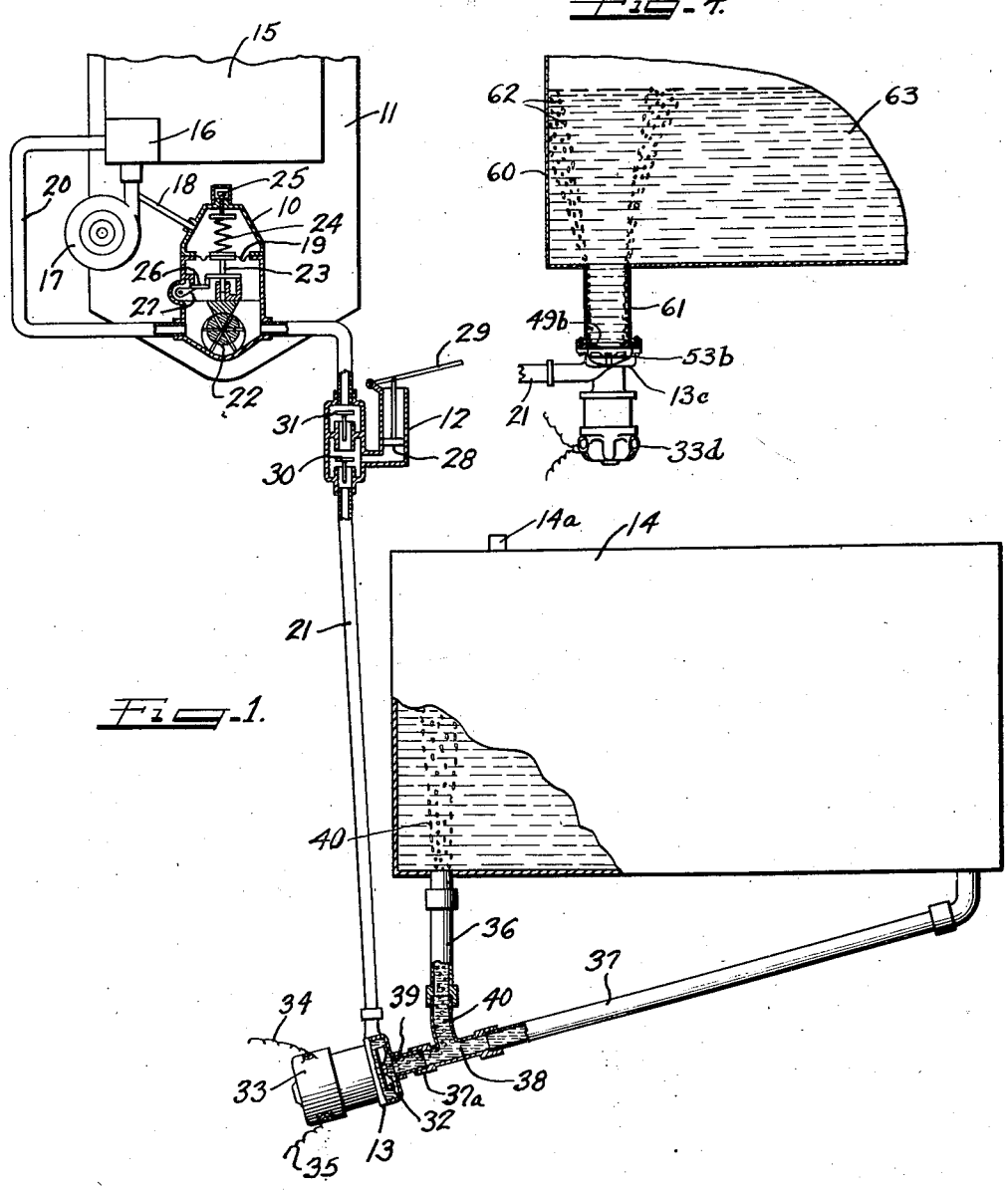
Inventor
RUSSELL R. CURTIS Aug. 29, 1944.   R. R. CURTIS   2,357,174
FUEL PUMPING SYSTEM
Filed Sept. 5, 1941   2 Sheets-Sheet 2
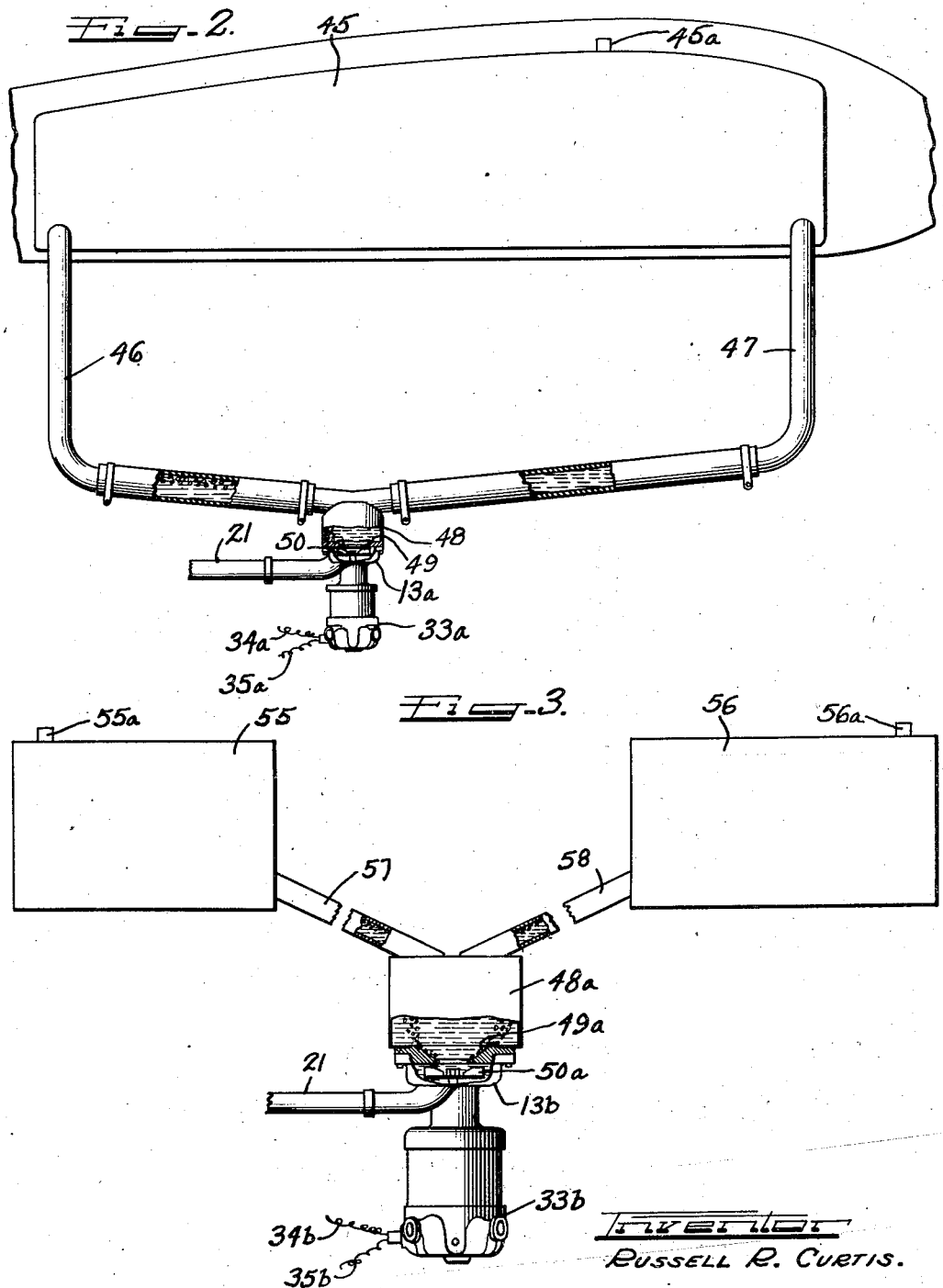

Patented Aug. 29, 1944

2,357,174

UNITED STATES PATENT OFFICE 2,357,174

FUEL PUMPING SYSTEM

Russell R. Curtis, Dayton, Ohio, assignor to Curtis Pump Company, Dayton, Ohio, a corporation of Ohio Application September 5, 1941, Serial No. 409,646

17 Claims. (Cl. 158—36.3)

The present invention, which is a continuation-in-part of the subject matter of my copending application for patent entitled "High altitude fuel system for aircraft," filed March 18, 1940, United States Serial No. 324,658, relates to fuel systems and is more particularly directed to fuel systems for aircraft which fly at high altitudes.

It is well known that the usual aircraft fuel systems operate satisfactorily at customary or usual flying altitudes. However, these systems usually fail to provide the necessary flow of fuel to an aircraft engine at any higher altitudes.

When flying at high altitudes, the pressure on the inlet side of the aircraft engine fuel pump is lowered by reason of the reduced atmospheric pressure. Usually, in aircraft design, the fuel tank is positioned below the level of the engine and its carburetor so that the pressure at the inlet side of the engine fuel pump drops below the atmospheric pressure on the fuel in the tank, due to the suction head at the engine pump inlet.

Even when there is little relative difference between the elevation of the engine and the fuel tank, the suction pipe is usually of sufficient length so that a considerable equivalent suction head is created at the inlet side of the engine pump.

As a result of the foregoing conditions, the fuel starts breaking into vapor at the engine pump inlet at considerably lower altitudes than it does in the fuel tank. During changes in atmospheric pressures, the air and fixed gases in solution start to evolve and the lighter constituents in the fuel to vaporize until the engine fuel pump is incapable of delivering fuel in a fully liquid state to the engine. This condition is known as vapor lock.

Furthermore, the agitation of the fuel by the fuel pump serves to aggravate this difficulty by accelerating the separation of air or other gases or vapors from the liquid fuel.

Various fuel systems have been proposed to obviate this difficulty, but they have thus far failed to satisfactorily reduce the hazard of fuel system failure. The present invention seeks to remedy this condition.

Generally, the present invention provides a power pump, preferably though not necessarily, driven directly by the engine for supplying fuel to the engine from its suction inlet. A hand pump is connected, although this also is not necessary, in the supply pipe to the suction side of the power pump. Both pumps are provided with means to by-pass fuel flowing through the supply pipe to the engine whereby the power pump may draw fuel through an inoperative hand pump, or the hand pump may force fuel through a stalled, broken, or partly incapacitated power pump.

As described in my copending application Serial No. 324,658, it is essential that the power pump be so devised that the discharge pressure is independent of varying suction pressures between the limits of sea level pressure and the approximate vapor pressure of the fuel being pumped.

When flying at high altitudes, power pump failure invariably occurs when the absolute pressure on the fuel at any point in the suction pipe between the fuel tank and power pump falls below the vapor pressure of the fuel, for the reason that the fuel begins to boil at the suction inlet of the power pump and the pump can therefore no longer lift it. Inasmuch as the absolute pressure on the fuel in the tank and the suction piping extending therefrom to the power pump is almost directly in proportion to the pressure of the ambient air in which the aircraft is flying, it will be obvious that the altitude to which any aircraft may be flown when equipped with the usual fuel systems is quite limited.

This condition is overcome in the present invention by providing an auxiliary pump in the fuel supply pipe on the suction side of the power pump for maintaining sufficient pressure at that point to prevent vaporization at high altitudes. This pump is preferably of a centrifugal type for the reason that it has inherent by-pass capacity when inoperative, thereby permitting flow of fuel through the pipe at all times.

It is preferred that the auxiliary pump be driven by means separate from the power pump and selectively controlled for operation as desired.

The auxiliary pump is connected to one or more fuel tanks by means which insure the separation of the vapor from the liquid fuel in order that wholly liquid fuel be delivered to the supply pipe of the aircraft engine.

It is, therefore, an important object of this invention to provide a fuel system for aircraft which assures the proper flow of fuel to the engine when the craft is operated at high altitudes.

Another object of the present invention is to increase the hydraulic gradient of fuel fed to a booster pump.

Still another object of this invention is to provide a fuel system having an auxiliary pump so connected to a fuel tank that fully liquid fuel may be drawn from the tank considerably above the altitude at which the fuel has begun boiling in the tank.

A further object of this invention is to provide a fuel system having an auxiliary pump hydraulically connected to a fuel tank in spaced relation therefrom.

A still further object of the invention is to provide a fuel system having an auxiliary pump fed by a plurality of conduits for augmenting the pressure on the suction side of the power pump at high altitudes to prevent vapor lock.

Another and still further object of the present invention is to provide a fuel system with an auxiliary pump spaced below a fuel tank for pressuring the suction side of a main fuel pump.

Still another object of the present invention is to provide a fuel system for aircraft in which an auxiliary pump in the supply pipe to the engine is connected to a plurality of fuel outlets in a fuel supply source.

A still further object of the present invention is to provide a sump in a fuel system between an auxiliary pump and a plurality of fuel supply pipes which receive fuel from a source of supply.

A further object of the present invention is to provide a fuel tank and an auxiliary pump with connected conduit means therebetween which slope angularly downward from the tank to the pump to avoid trapping in the conduit means of vapor bubbles released from the liquid fuel in the pump.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a fragmentary view in elevation, with parts broken away and shown in vertical cross section, of a fuel system embodying principles of the present invention;

Figure 2 is a fragmentary view in elevation, with parts broken away and shown in vertical cross section, illustrating a modification of the connection between an auxiliary pump and a fuel tank having a plurality of outlets;

Figure 3 is a view similar to Figure 2, illustrating a further modification of the connection between an auxiliary pump and a plurality of fuel tanks; and, Figure 4 is a fragmentary view, partially in vertical cross-section and partially in elevation, illustrating a still further modification of a connection between an auxiliary pump and a fuel tank.

The fuel system illustrated in Figure 1 generally comprises a power pump 10, preferably driven by an aircraft engine 11, an emergency hand pump 12, an auxiliary or booster pump 13, a vented fuel tank 14 and fuel flow connections therebetween which will be described in greater detail hereinafter.

The aircraft engine 11 has an intake manifold 15, a carburetor or functionally similar device 16, and preferably a supercharger 17 discharging into the carburetor intake. The output side of the supercharger is connected by a small pipe 18 to the space above a relief valve balancing diaphragm 19 of the power pump 10. A discharge pipe 20 connects the output side of the pump 10 to the carburetor 16, while a suction pipe 21 operatively connects the inlet side of the pump to the bottom of the fuel tank 14. The fuel tank 14 is of conventional construction in that it is provided with vent means 14a.

The power pump 10 includes an offset rotor 22 of the sliding vane type. A one-way relief valve 23 is normally urged by a coiled spring 24 to a closed position, the compression of the spring being adjustable by a screw 25. The relief valve allows excess fuel at the pressure selected by adjustment to return from the discharge to the intake side of the pump. A one-way by-pass valve 26 is operative to allow fuel to pass from the suction to the discharge side of the pump and is normally urged to a closed position by a light spring 27.

The emergency hand pump 12 is of conventional construction and is preferably, although not necessarily, connected in the suction pipe 21 between the power pump 10 and the auxiliary pump 13. As shown, the pump 12 includes a piston 28, operable by a handle 29, an intake valve 30 and a discharge valve 31. No special by-pass means is provided in the hand pump 12 since fuel may, when required to do so, flow therethrough from the tank 14 to the carburetor 16 by raising both the intake valve 30 and the discharge valve 31.

The auxiliary or booster pump 13 is of the centrifugal type, having an impeller 32 driven by a small electric motor 33. The electric motor 33 is energized through the electrical conduits 34 and 35 from a source of electrical energy (not shown). In this manner, the auxiliary pump 13 is made operative as desired either during take-off of the aircraft, for assisting the power pump in an emergency, or for preventing vapor lock at high altitudes. The motor 33 for driving the pump 13 is operatively controlled through a hand switch (not shown). With this switch, the auxiliary pump 13 may be operated at any time, separately or in conjunction with either or both of the other fuel pumps at the discretion of the pilot.

The inlet side of the pump 13 is connected by means of the conduits 36 and 37 to space outlet openings in the bottom of the fuel tank 14. The discharge side of the pump is connected to the fuel supply conduit 21.

While it is preferred that the pump be connected to the fuel tank in a manner as shown and previously described, it may be otherwise connected thereto in any other manner providing that the auxiliary pump be positioned normally below the hydraulic gradient of the system. As is well known, fluid may be passed by gravity or other external force in either direction through the centrifugal pump quite freely while the impeller is not being rotated.

While it is preferred that the sequence of pumps between the fuel tank and aircraft engine be as illustrated and described, some departure therefrom may, under certain circumstances, be allowed.

As illustrated in Figure 1, the suction pipes 36 and 37 are connected to the fuel tank 14 at spaced points and converge into connection with a sump member 37a which is connected to the inlet of the auxiliary pump 13. As the auxiliary pump 13 is positioned below the hydraulic gradient, the liquid fuel 38 flows by gravity from the fuel tank 14 into the inlet throat 39 of the auxiliary pump. The relative sizes of the impeller vanes 32 and the inlet throat 39 and the relative position of the vanes and throat are such that a whirlpool is provided in the fuel as it enters the pump through the sump member 37a.

When an altitude is reached at which gas or vapor is liberated from the liquid fuel in the tank 14, scattered bubbles will first appear throughout the tank. In addition, whenever the auxiliary pump 13 is operated, bubbles will be created around and adjacent the impeller 32 thereof. The action of centrifugal force created in the whirlpool immediately above the impeller vanes effects a separation of the bubbles from the liquid fuel. These light, free bubbles 40 rise through the heavier liquid fuel along the upper side of the inclined sump member 37a. Since the suction pipe 36 is connected to adjacent ends of the suction pipe 37 and the sump member 37a at the top side thereof, which is directly in the path of the rising bubbles 40, the vapor bubbles will flow upwardly through the pipe 36. As the bubbles rise upwardly through the suction pipe 36, they impede the downward flow of fuel in this pipe and liquid fuel will then be drawn downwardly through the suction pipe 37 where it flows between the impeller vanes 32 and is centrifugally forced outward through the supply pipe 21. As is shown in Figure 1, the bubbles 40 continue to rise through the fuel in the tank 14 where they burst into the atmosphere and are liberated through the vent 14a.

The suction pipes 36 and 37 communicate with the tank 14 at spaced points and preferably at the ends of the tank so that when the tank is only partially filled and is tilted during maneuvering of the aircraft so as to expose one of the outlets, the other outlet will still be below a pond of fuel. As a result the pump is always fed from the tank as long as fuel remains therein.

Figure 1 illustrates the suction pipes 36 and 37 as being of unequal length merely for purposes of best illustrating the separation of gas and vapor bubbles from the liquid fuel and the manner in which the bubbles are liberated into the atmosphere. The same separation and liberation of vapor bubbles may be effected by providing suction pipes of the same length or in which either one is longer than the other. Furthermore, the suction pipes may be so disposed as to normally position the auxiliary pump anywhere below the fuel level in the fuel tank.

The lengths, sizes and relative positions of the suction pipes with respect to the pump and tank will determine through which pipe the vapor bubbles rise and through which pipe the liquid fuel will flow into the pump inlet.

In the modification shown in Figure 2, a fuel tank 45, having a vent 45a, is provided with outlets adjacent its lower corners and suction pipes 46 and 47 connected thereto. The ends of the suction pipes 46 and 47 are connected to an enlarged sump 48 having a booster pump 13a depending therefrom.

The auxiliary or booster pump 13a is preferably of the type shown in my copending application entitled "Booster pump for aircraft fuel systems," filed August 10, 1940, United States Serial No. 352,064, now U. S. Patent 2,292,993 issued August 11, 1942. The auxiliary pump is connected to the sump 48 in such a manner as to provide a throat member 49. The impeller 50 of the pump has a plurality of vanes thereon and is rotated by an electric motor 33a. The arrangement of the vanes of the impeller 50 and the throat 49 is such as to provide a funnel-shaped whirlpool in the fuel in the sump which fuel flows by gravity from the tank 45 through the pipes 46 and 47 into the sump 48. Any bubbles of gas in the fuel in the sump 48 will be concentrated around the outer periphery of the whirlpool, and, being lighter than the liquid fuel will rise in a path either of least resistance or as directed back up to the tank 45.

If the contour of the upper surface of the sump 48 is such as to direct the rising bubbles, the flow thereof will be through the suction pipe into which they are directed while flow of the liquid fuel will be through the other pipe in much the same manner as previously described with Figure 1. However, if the contour of the upper surface of the sump 48 is such that the bubbles are not directed as they rise, then the path along which they flow will be through the pipe offering the least resistance. Once the flow of vapor bubbles is established, it continues as long as the system is not disturbed. In an aircraft system, since the craft is never perfectly stable in flight due to rolling, pitching or maneuvering, the flow path of vapor bubbles changes frequently so that the bubbles rise through either suction pipe while the liquid fuel flows through the other suction pipe into the sump where it is pumped into the supply pipe 21 by the impeller 50.

The suction pipes 46 and 47, like the suction pipes 36 and 37 illustrated in Figure 1, may be of the same length or of unequal lengths. The relative lengths and sizes of the suction pipes, their positions with respect to the fuel tank and auxiliary pump, the position of the aircraft in flight, and the contour of the upper surface of the sump are all factors in determining the suction pipe through which the vapor bubbles rise and through which the liquid fuel flows into the sump.

A further modification is illustrated in Figure 3. In this construction, separate fuel tanks 55 and 56, having vents 55a and 56a, are each connected by a separate supply pipe 57 and 58 to a sump 48a. Fuel flows from the tanks 55 and 56 through either of the pipes 57 and 58 into the sump 48a and downwardly through the throat 49a. Centrifugal action of the impeller 50a, rotated by the electric motor 33b, separates the lighter gas bubbles from the heavier liquid fuel in the same manner as described previously. The suction pipes 57 and 58 may be equal in length or of unequal lengths. As the vapor bubbles rise in the sump 48a they flow upwardly through either of the pipes 56 and 57, depending on which pipe offers a path of least resistance at the moment. For example, if the bubbles rise through the pipe 57 the flow of fuel is impeded from the tank 55 and liquid fuel is thereby drained from the tank 56. As soon as the hydraulic head has dropped in the tank 56 sufficiently to change the resistance on pipes 57 and 58, the bubbles will commence to rise in the pipe 58 thereby impeding the flow of fuel in that pipe so that fuel then flows from the tank 55 through the pipe 57.

The alternate flow of fuel from the tanks 55 and 56, dependent on differential hydraulic head, serves to drain the tanks substantially equally. As long as no factor is introduced to disturb this action, fuel will flow alternately from the tanks 55 and 56 until they are emptied.

The heavier liquid fuel, after the gas bubbles have been separated therefrom, is delivered under pressure into the supply pipe 21 by the centrifugal force of the rotating impeller.

The operation of the fuel system herein described is the same for any of the forms of connection between the auxiliary or booster pump and the fuel supply source having a plurality of outlet openings.

Figure 4 illustrates a further modified form of construction in which an auxiliary pump 13c is connected to a fuel tank 60 by a single suction pipe 61. The suction pipe 61 is sufficiently large in diameter in order that the vapor bubbles 62 may rise around its inner periphery and upwardly through the fuel 63 in the tank where they eventually reach the surface of the fuel pond and burst into the atmosphere.

As the pump impeller 50b is rotated by the motor 33d, the vapor bubbles beaten out of the liquid fuel rise in a path along the tapered throat 49b and, being lighter than the liquid fuel, continue to rise upwardly through the suction pipe as illustrated. Fully liquid fuel is then drawn axially downward through the suction pipe 61 where it is pumped by the impeller 50b into the delivery pipe 21.

It is to be noted that the suction pipe 61 is illustrated as being in a vertical position. If desired, this pipe may be positioned in a sloping manner similar to the suction pipes of Figures 1, 2 and 3. In the suction pipes of the latter figures, this sloping arrangement is important so as to avoid trapping of the vapor bubbles in pipes of relatively small diameter.

When flying at moderate altitudes, the power pump 10 is entirely capable of raising the fuel against the normal suction head in the supply pipe 21 and delivering it to the carburetor 16 under the necessary pressure. Any change in the rate of fuel consumption is automatically compensated for by the relief valve 19. Furthermore, any normal variation in the suction head between the fuel tank and power pump, due to the change in the height of the tank relative to the power pump, as the aircraft climbs or dives, is taken care of by a balancing mechanism in the relief valve by which the pressure in the discharge pipe 20 is maintained constant regardless of any change in pressure in the suction side of the pump.

Should the power pump 10, for any reason, fail to deliver the required fuel pressure, the hand pump 12 may be placed in operation for the purpose of pumping fuel through the power pump from the source of supply. If an additional aid is required, the auxiliary pump may be made operative to supplement the hand pump 12. In other circumstances, such as low altitude flying, the auxiliary pump 13 alone may provide the necessary fuel by pumping through both the hand and power pumps.

Consequently, any combination between the three pumps may be utilized to assure the necessary supply of fuel to the aircraft engine depending upon the altitudes and flying conditions at which the aircraft is being operated.

The spacing of the inlet to the booster pump below the source of fuel effects an increased hydraulic head pressure on the fuel at the inlet thereby aiding the pumping action of the booster. In addition, when the ambient air pressure on the fuel in the tank decreases to such an extent that gases are liberated from the fuel these gases will be generated mostly in the upper portion of the fuel pond where the hydraulic pressure is not so great as in the sump. Thus there will be somewhat of a lag between the time of bubble generation in the tank and bubble generation in the sump. As a result, the density of the fuel in the sump is greater and the fuel is more fully liquid than in the tank. The sump arrangement thus enhances the action of the booster pump in insuring the feeding of fully liquid fuel to the main pump.

From the foregoing description it will be apparent that aircraft provided with a fuel system as herein described and illustrated, may be flown to considerably higher altitudes than has heretofore been possible. Even after considerable vaporization has taken place in the fuel tank, evidenced by gaseous bubbles appearing through the fuel supply, these bubbles are separated out and fuel in a fully liquid state is supplied under pressure to the suction pipe of the engine pump. Vapor lock is thereby eliminated and the proper supply of fuel is maintained to the carburetor of the aircraft engine.

While particular embodiments of this invention have been illustrated, it will, of course, be understood that the invention should not be limited thereto, since many modifications may be made and, therefore, it is contemplated by the appended claims to cover all such modifications as fall within the true spirit and scope of the present invention.

I claim as my invention:

1. In a fuel delivery system having a vented fuel tank with a pair of outlet openings and a fuel delivery pipe, a booster pump in said delivery pipe at a level below the tank, a fuel conduit from said booster pump to one of the outlet openings in said tank, and a second fuel conduit from another of the outlet openings in said tank and connected to said first conduit between said one outlet opening and said booster pump.

2. In a fuel delivery system having a vented fuel tank with a horizontal bottom wall having a pair of outlet openings and a fuel delivery pipe, a booster pump in said fuel delivery pipe below the hydraulic gradient of said tank, a fuel conduit extending at an acute angle relative to the tank bottom wall between one of the outlet openings therein and said booster pump, and a shorter fuel conduit extending substantially vertically relative to the tank bottom wall from another of the outlet openings therein and connected to said first conduit at a point closer to said booster pump than to said one outlet in the tank.

3. In a fuel delivery system having a fuel tank with a pair of outlet openings and a fuel delivery pipe, a booster pump having the discharge side thereof connected to said delivery pipe, a sump at a level below the tank discharging into the inlet side of the pump, and fuel conduits extending upwardly from said sump to the outlet openings of said tank, one of said conduits being longer than the other.

4. In a fuel delivery system having a plurality of fuel tanks each having an outlet opening, a fuel delivery pipe, a booster pump at a level below said tanks connected at its outlet side to said delivery pipe, and a fuel conduit extending downwardly from each tank outlet, said conduits being hydraulically connected to the inlet side of said booster pump whereby fuel flows by gravity to the booster pump and is delivered under pressure by said booster pump to said delivery pipe.

5. In a fuel delivery system having a plurality of fuel tanks each having an outlet opening, a fuel delivery pipe, a centrifugal booster pump connected at its outlet side to said delivery pipe, a sump member at a level below the tanks communicating with the inlet side of said booster pump, said booster pump having vanes and an inlet throat on the inlet side thereof arranged for creating a whirlpool in the sump to separate gases from liquid fuel, and a fuel conduit for each tank outlet, said conduits being connected to said sump member for delivering fuel from said tanks to said booster pump whereby gas separated from the fuel by the centrifugal action of said pump rises through one of said conduits, liquid fuel flows to said pump through another of said conduits, and liquid fuel is delivered under pressure to said delivery pipe by said booster pump.

6. A fuel system adapted for aircraft comprising a fuel tank having a pair of spaced outlets positioned so that at least one is below fuel in the tank irrespective of the tilted positions of the tank assumed in operation of the aircraft, a pump spaced below the bottom of the tank and a plurality of fuel pipes each connecting an outlet with the pump whereby fuel delivery to the pump is insured even when the tank is tilted to expose an outlet.

7. In a system for the delivery of a relatively volatile liquid fuel from a vented fuel supply tank, a centrifugal type pump positioned below the normal level of the bottom of said tank, and conduit means connecting the intake of said pump to the interior of said tank, said conduit means having a greater flow capacity than the requirements of said pump whereby the rate of flow of liquid fuel through said conduit means is sufficiently low to permit the counter flow of vapor bubbles released at or adjacent said pump intake back into said tank.

8. In a system for the delivery of a relatively volatile liquid fuel from a vented fuel supply tank to a delivery pipe, a centrifugal type pump positioned below the normal level of the bottom of said tank for separating gas and vapor in bubbles from liquid fuel flowing thereto and for pumping said liquid fuel to said delivery pipe, and high flow capacity conduit means connecting said tank and pump effective to permit said gas and vapor bubbles to rise into the tank around the inner periphery thereof and to permit the counterflow of liquid fuel along its longitudinal axis from said tank into said pump.

9. In a system for delivery of a relatively volatile liquid fuel from a vented fuel supply tank to a delivery pipe, a pump in spaced relation from said tank and normally below the liquid level therein, said pump having means for beating out gas and vapor bubbles from liquid fuel flowing thereto and for pumping said liquid fuel to said delivery pipe, and conduit means connecting said tank and pump, said conduit means having a portion thereof through which said gas and vapor bubbles rise from said pump into said tank and having another portion through which liquid fuel flows from said tank to said pump.

10. In a fuel delivery system, a source of fuel supply having a pair of flow outlets, a centrifugal pump having an inlet below said source and an outlet, and means adjacent said inlet separating bubbles of gas and vapor from liquid fuel at said inlet, conduit means connecting said flow outlets and the inlet of said pump arranged to pass liquid fuel and gas in countercurrent directions and a delivery conduit receiving liquid fuel free of gas from said outlet of said pump.

11. In a fuel delivery system, a plurality of downwardly extending fuel delivery conduits having portions connected to each other, a booster pump having means adjacent the inlet thereof for separating bubbles from liquid fuel adjacent the inlet, and a sump member between said connected conduit portions and the inlet of said booster pump for receiving fuel from said conduits and delivering the same to said booster pump, said conduits arranged to accommodate passage of separated bubbles of gas rising from said sump as well as flow of fuel to the pump whereby said booster pump delivers gas-free fuel under pressure therefrom.

12. In a fuel delivery system, a vented fuel tank, a plurality of flow conduits extending from the tank in a downward direction, said conduits being connected together in spaced relation from said tank, a centrifugal pump having an agitator for separating bubbles of gas from liquid fuel adjacent the pump inlet, and a sump member connecting said connected conduits and the inlet of said pump.

13. In a liquid delivery system having a liquid containing tank with a pair of outlet openings and a liquid delivery pipe, a centrifugal type pump having an inlet side at a lower level than liquid in the tank and a discharge side, said discharge side being connected to said delivery pipe, a sump at the inlet side of said pump, conduits extending from said sump to the outlet openings of said tank, one of said conduits being longer than the other, and said pump having means adjacent the inlet side thereof for separating gases in liquid contained in the sump, said shorter conduit accommodating passage of the separated gases from the sump to the tank and said longer conduit accommodating flow of liquid from the tank to the sump.

14. A fuel system adapted for high altitude aircraft performance by the delivery of fully liquid fuel which comprises a fuel tank, a booster pump spaced below the fuel tank, a feed conduit connecting the tank with the inlet of the pump, a fuel delivery conduit connected with the outlet of the pump, and means adjacent the inlet of the pump for separating bubbles of gas and vapor from liquid fuel adjacent the inlet to deliver fully liquid fuel to the pump, said spacing of the pump below the fuel tank producing a hydraulic head pressure of fuel at the inlet of the pump to diminish generation of bubbles at said inlet.

15. In a fuel delivery system, a vented fuel tank with first and second outlet openings, a centrifugal booster pump at a level below the tank having an inlet throat and vanes arranged for creating a whirlpool in fuel fed to the pump to separate gases from liquid fuel, a first conduit connected to the first outlet opening in said tank, and a second and longer conduit connected to the second outlet opening in said tank and to said booster pump, said first conduit being hydraulically connected to said second conduit at a point closer to said booster pump than to said first outlet opening, said booster pump receiving fuel from said tank through said conduit and separating gas therein from the liquid fuel whereby the lighter gas rises in said first conduit and liquid fuel only flows through said second conduit into the booster pump for delivery under pressure therefrom.

16. In an aircraft fuel delivery system, an aircraft, means on the aircraft defining a vented source of fuel supply having a pair of flow outlets positioned so that at least one outlet remains covered by fuel in the means irrespective of the tilted positions of the means and the aircraft, a pump below said means having an inlet, and conduit means connecting said flow outlets and the inlet of said pump.

17. A fuel delivery system comprising a fuel tank, a booster pump receiving fuel by gravity flow from said tank, means on the pump for separating bubbles of gas and vapor from fully liquid fuel, a delivery pipe receiving fuel under pressure from said pump, a second pump receiving fuel from said pipe, and a plurality of conduits joining the inlet of the first mentioned pump with the lower portion of said tank at widely spaced points in the tank accommodating gravity flow of fuel from the tank to the inlet of the first mentioned pump as well as countercurrent bubble flow from said first mentioned pump back to the tank.

RUSSELL R. CURTIS.